United States Patent
Bono et al.

(10) Patent No.: US 10,114,829 B1
(45) Date of Patent: Oct. 30, 2018

(54) MANAGING DATA CACHE FOR FILE SYSTEM REALIZED WITHIN A FILE

(71) Applicant: EMC IP Holding Company LLC, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 465 days.

(21) Appl. No.: 14/752,484

(22) Filed: Jun. 26, 2015

(51) Int. Cl.
G06F 17/30 (2006.01)

(52) U.S. Cl.
CPC .... G06F 17/30132 (2013.01); G06F 17/3007 (2013.01)

(58) Field of Classification Search
CPC .................................................. G06F 17/30132
See application file for complete search history.

(56) References Cited

U.S. PATENT DOCUMENTS

| | | | |
|---|---|---|---|
| 5,784,548 A * | 7/1998 | Liong | G06F 1/30 711/106 |
| 6,378,037 B1 * | 4/2002 | Hall | G06F 11/1441 711/112 |
| 8,661,068 B1 | 2/2014 | Seibel et al. | |
| 9,069,682 B1 | 6/2015 | Veeraswamy | |
| 9,122,589 B1 | 9/2015 | Bono et al. | |
| 9,146,928 B1 | 9/2015 | Noveck | |
| 9,280,578 B1 | 3/2016 | Zhou et al. | |
| 9,286,007 B1 | 3/2016 | Bono | |
| 9,645,932 B1 | 5/2017 | Bono et al. | |
| 2007/0136548 A1 * | 6/2007 | Mane | G06F 17/30088 711/170 |

* cited by examiner

Primary Examiner — Etienne P Leroux
Assistant Examiner — Dara J Glasser
(74) Attorney, Agent, or Firm — Bainwood Huang

(57) ABSTRACT

A technique for storing data in a data storage system includes receiving, from a host, a request specifying a set of data to be written to a first file system, the first file system realized as a file within a second file system. A first log entry is created for the set of data in a first data log, which logs data to be written to the first file system, and a second log entry is created for the set of data in a second data log, which logs data to be written to the second file system. The first log entry provides a reference to the second log entry. The technique further includes storing the data in the cache page and acknowledging the host.

20 Claims, 7 Drawing Sheets

MANAGING DATA CACHE FOR FILE SYSTEM REALIZED WITHIN A FILE

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Many data storage systems employ caches for promoting high-speed access to data. These caches are typically made from fast, volatile memory, which a data storage system can read and/or write quickly without experiencing the delays that normally accompany reads and writes of magnetic disk drives or flash drives. As is known, a write cache may be used to store data being written by hosts to a data storage system. In some variants, the write cache can acknowledge completion to a host once the data being written are stored in the cache, without having to wait for the data to be flushed to disk. In addition, a read cache may be used to store frequently-accessed data, i.e., for servicing host read requests without always having to obtain the requested data from disk. As used herein, the term "disk" refers to any type of nonvolatile storage device, including a magnetic disk, optical disk, flash drive, and the like, as well as combinations thereof, such as groups of such devices or of portions thereof accessed as a unit.

SUMMARY

One objective of caches in data storage systems is to provide fast responses to host IOs specifying write requests. Thus, it is often desirable to avoid time-consuming processing when caching data. For instance, if caching data arriving in a host IO write request requires a data storage system to read metadata from disk prior to storing the data in cache, the value of the cache would be greatly diminished.

Data storage systems are currently under development that realize host-accessible file systems in the form of files served from internal file systems. For example, a data storage system can internally store a host-accessible file system within a single file. This file includes both the data and the metadata of the host-accessible file system. The internal file system that serves the file is supported by a cache. Unfortunately, the cache in such a system is separated from arriving IO requests by at least two levels of mapping, e.g., a first level that maps a logical address of the host-accessible file system to a corresponding physical address within that file system, and a second level that maps that physical address to a physical address within the internal file system. What is needed is a way to cache and acknowledge, without excessive delay, host write requests directed to host-accessible file systems served from files of internal file systems.

In accordance with improvements hereof, a technique for storing data in a data storage system includes receiving, from a host, a request specifying a set of data to be written to a first file system, the first file system realized as a file within a second file system. A first log entry is created for the set of data in a first data log, which logs data to be written to the first file system, and a second log entry is created for the set of data in a second data log, which logs data to be written to the second file system. The first log entry provides a reference to the second log entry. The technique further includes storing the data in a cache page and acknowledging the host.

In some examples, to place the data in a proper location on disk after acknowledging the host, the technique further includes mapping the data through the first file system and the second file system to a location on disk and flushing the cache page to the location on disk.

Advantageously, the improved technique enables data specified in host IO requests to be written to cache and acknowledged quickly, prior to performing time-consuming mapping operations, and thus promotes low latency in responding to IO requests. Mapping through the first file system and through the second file system can be performed out of band with IO requests, thus enabling high performance to be maintained.

Certain embodiments are directed to a method for storing data in a data storage system. The method includes receiving, from a requestor, a request specifying a set of data to be written to a logical address in a first file system, the first file system realized as a file within a second file system. The method further includes creating a first log entry for the set of data in a first data log, the first data log logging data to be written to the first file system, and creating a second log entry for the set of data in a second data log, the second data log logging data to be written to the second file system. The first log entry provides a reference to the second log entry, and the second log entry provides a reference to a cache page. The method still further includes storing the set of data in the cache page referenced by the second log entry and acknowledging the requestor that the request has been completed.

Other embodiments are directed to a data storage system constructed and arranged to perform a method of managing data storage, such as the method described above. Still other embodiments are directed to a computer program product. The computer program product stores instructions which, when executed on one or more processing units of a data storage system, cause the data storage system to perform a method of storing data, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for storing data in a data storage system includes receiving, from a host, a request specifying a set of data to be written to a first file system, the first file system realized as a file within a second file system. A first log entry is created for the set of data in a first data log, and a second log entry is created for the set of data in a second data log. The first log entry provides a reference to the second log entry. The technique further includes storing the data in a cache page and acknowledging the host.

Figure 1:
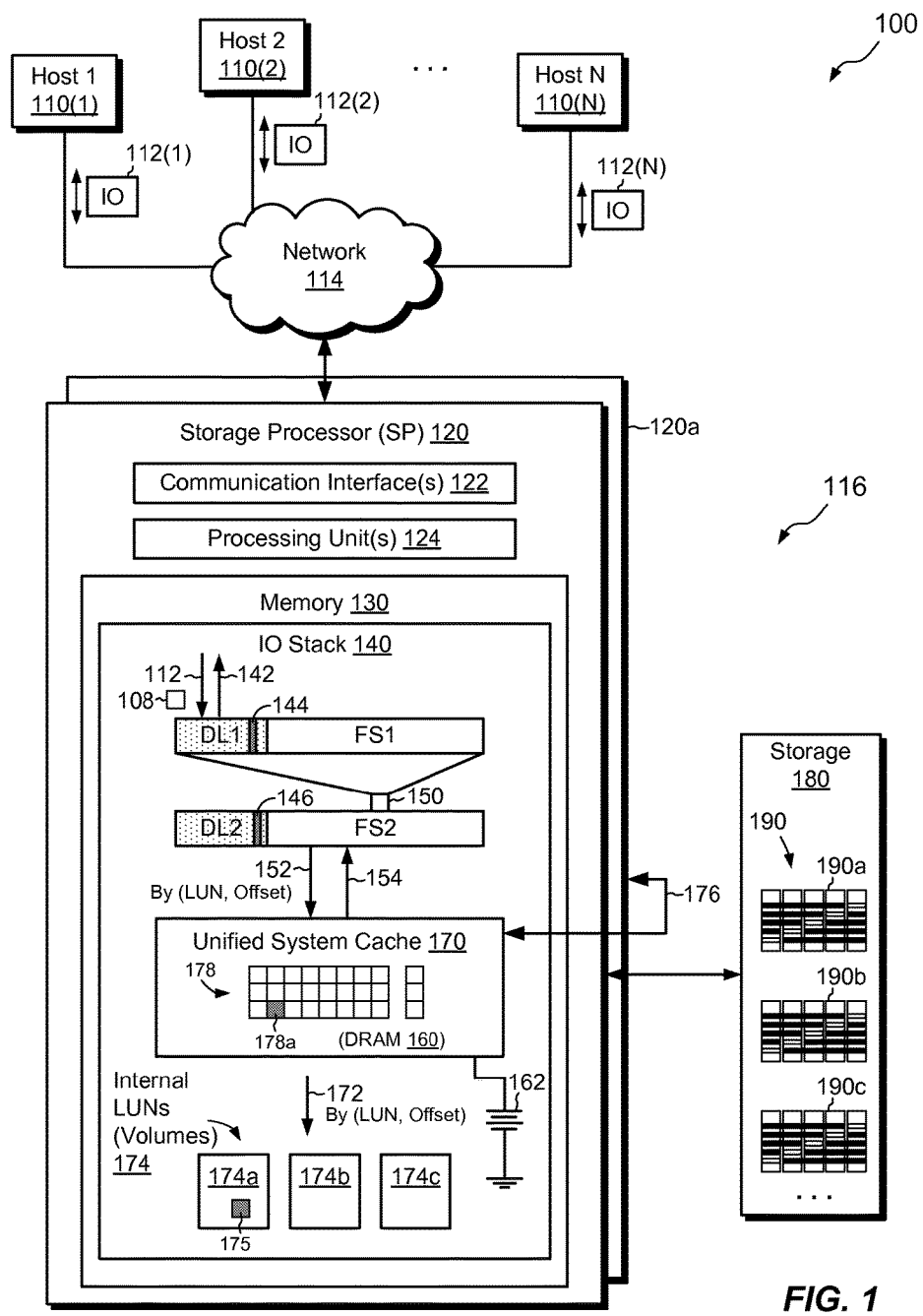
FIG. 1 is a block diagram of an example environment in which embodiments of the improved technique hereof can be practiced, which environment includes a first file system realized within a file of a second file system.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 includes RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180. Although the data storage system 116 is capable of receiving and processing both block-based requests and file-based requests, the invention hereof is not limited to data storage systems that can do both. For example, embodiments of the invention hereof may be practiced in data storage systems that are configured to receive and process file-based requests but not block-based requests.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140. The IO stack 140 provides an execution path for host IOs (e.g., IO requests 112(1-N)). It can be seen that the IO stack 140 includes a first file system (FS1), a second file system (FS2), a unified system cache 170, and internal LUNs (volumes) 174, e.g., in the form of LUNs 174a, 174b, and 174c. "LUN" is an acronym for "logical unit number," a term that refers not only to an identifying number (i.e., a unit number) but also to the volume itself. Here, each of the LUNs 174 is a logical representation of a set of the RAID groups 190, such as one RAID group, for example. In the example shown, LUN 174a provides a logical representation of RAID group 190a, LUN 174b provides a logical representation of RAID group 190b, and LUN 174c provides a logical representation of RAID group 190c. The data storage system 116 may include any number of RAID groups 190, and the IO stack 140 may provide any number of internal LUNs 174 to support them.

Each LUN 174 has an addressing scheme that the IO stack 140 can use to access blocks of the underlying RAID group. The addressing scheme for each LUN 174 is based on LUN (unit number identifier) and offset into the LUN. For instance, each LUN 174 expresses its underlying RAID group as a range of contiguous blocks, such that any block within a RAID group can be accessed by specifying an offset into the LUN 174. The offset represents a block number relative to a starting point of the LUN 174. A "block" is the smallest allocatable unit of storage, which may be 8 KB in size, although blocks may be provided in any suitable denomination.

The unified system cache 170 is seen to include multiple cache pages 178. In an example, cache pages 178 are tagged with respective addresses in the LUNs 174 and may thereafter be accessed via the tags using the same addressing scheme as was described above for addressing blocks in the LUNs 174. For example, the IO stack 140 may access cache pages 178 in the unified system cache 170 by specifying a LUN identifier and an offset into the LUN. Thus, for example, the IO stack 140 can read and write pages 178 in unified system cache 170 using the same addressing scheme that it uses to read and write blocks in the LUNs 174.

In the particular example shown, the unified system cache 170 is implemented in DRAM (Dynamic Random Access Memory) 160. Although DRAM 160 is normally regarded as volatile (non-persistent) memory, persistence of the DRAM 160 and thus of the unified system cache 170 is achieved through the use of batteries 162. Batteries 162 provide backup power in the event of a power loss and thus enable the DRAM 160 to hold its contents in place until power can be restored. Although other portions of the data storage system 116 may lose power and become inoperative, the unified system cache 170 continues to function.

In an example, the SP 120a is constructed similarly to the SP 120, such that the SP 120a has its own unified system cache 170, e.g., implemented in DRAM and backed up by battery 162. To provide additional protection, the data storage system 116 mirrors the contents of DRAM 160 on SP 120 to the DRAM on SP 120a, e.g., via connection 176. The converse may also be the case, with the contents of DRAM 160 on the SP 120a mirrored over connection 176 to the DRAM 160 on SP 120. Thus, not only is the unified system cache 170 backed up by battery 162 on each SP, but also it is mirrored to the other SP, where the mirrored version is also backed by battery. Of course, the data storage system 116 may include greater than two SPs, and mirroring of the cache 170 may be performed over any number of them. In an example, the connection 176 over which mirroring takes place includes a PCI Express cable directly connecting the two SPs.

It should be understood that battery-backed DRAM is merely one example implementation for achieving persistence in the unified system cache 170. For instance, various high-speed, persistent memory technologies are currently being developed. It is expected that the battery-backed DRAM used in the illustrated embodiments may be replaced over time with high-speed, persistent storage, which does not require battery backup to achieve its persistence. Such new storage technologies, once they become available, could easily be swapped into the embodiments presented here, to provide even more efficient solutions. Such replacements are considered to fall within the scope of the invention hereof.

With further reference to FIG. 1, it is seen that the first file system, FS1, is realized within a file 150 of the second file system, FS2. For example, FS2 is configured for storing the file 150, and the contents of the file 150 include all the data and metadata of FS1. In addition, FS1 has a data log, DL1, and FS2 has a data log, DL2. DL1 logs data directed to FS1, such as data specified in incoming IO requests 112. DL2 logs data directed to FS2. Owing to the fact that FS1 is stored within a file 150 of FS2, data written to DL2 arises as a consequence of writing data to DL1.

In an example, each of the data logs, DL1 and DL2, has a respective head and a respective tail and is arranged as a circular buffer. Generally speaking, new log entries into each log are placed at the tail of the respective log and older log entries are flushed from the head. A log manager (not shown) for each log processes incoming writes to the respective log and performs flushing, e.g., on a regular basis and/or in response to the log reaching a high water mark, to prevent the respective log from becoming full. Flushing a log entry from a data log entails placing the data for that log entry at the appropriate mapped locations within the respective file system, e.g., at the physical addresses indicated by the file system's inodes, indirect blocks, and so forth.

In the example shown, DL1 is embedded within FS1 and occupies a known set of physical addresses within FS1, such as within a contiguous range of physical addresses. Likewise, DL2 is embedded within FS2 and occupies a known set of physical addresses within FS2. It should be understood, however, that other embodiments do not require the data logs DL1 and DL2 to be embedded within the respective file systems that they serve.

In example operation, the data storage system 116 receives an IO request 112 (e.g., any of 112(1) to 112(N)) from a host (e.g., any of hosts 110(1) to 110(N)). The IO request 112 specifies a set of data 108 to be written to FS1, e.g., at a designated logical address. In an example, the IO request 112 specifies the logical address in the form of an FSID (File System Identifier), file ID (directory and file name, or inode number), and logical offset into the specified file. Thus, the logical address provides all the information needed for the data storage system 116 to identify the block or blocks being written. In some examples, the IO request 112 may also specify a replica ID, e.g., in some situations where snaps are provided.

The IO request 112 enters the IO stack 140, which directs the IO request 112 to DL1. The log manager for DL1 creates a new log entry 144 (a "first" log entry), e.g., at the current tail of DL1, and creates metadata for identifying a location of the first log entry 144 within DL1. The log manager also sends an instruction down the IO stack 140 to direct persistent storage of the set of data 108. The instruction propagates to DL2, and the log manager of DL2 creates a new log entry 146 (i.e., a "second" log entry) in DL2, e.g., at the current tail of DL2. The log manager for DL2 also creates metadata, for identifying the location of the second log entry 146 in DL2, and sends an instruction 152 further down the IO stack 140 to direct the set of data 108 to be persistently stored. Here, the instruction 152 directs the set of data 108 to one of the internal LUNs 174 at a predetermined LUN address 175. The LUN address 175 is predetermined because the data storage system 116 establishes a correspondence between each physical address of FS2 and a respective LUN address, i.e., specified by LUN identifier and offset. Given that the second log entry 146 resides at a particular physical address within FS2, the physical address of the second log entry 146 translates directly to the LUN address 175.

Rather than immediately storing the set of data 108 at the LUN address 175, which involves a write to disk and is therefore inefficient, the IO stack 140 first caches the set of data 108 in the unified system cache 170. Here, the unified system cache 170 stores the set of data 108 in cache page 178a. In this example, storing the set of data 108 in cache page 178a is the first time the set of data 108 have been stored by the IO stack 140. Although log entries 144 and 146 describe the set of data 108, they need not store the set of data 108 locally. Rather, cache page 178a may be the only location, so far, where the data storage system 116 actually stores the set of data 108. Because the cache page 178a is implemented in DRAM 160, which is backed by battery 162 and may be mirrored to another SP, the storage of the set of data 108 in cache page 178a is deemed persistent. The unified system cache 170 returns an acknowledgement 154 indicating that the set of data 108 have been stored, and the acknowledgement 154 propagates up the IO stack 140, eventually emerging as acknowledgement 142. The data storage system 116 the returns the acknowledgement 142 to the requesting host, e.g., as part of a response to the IO request 112. The host receives the response and proceeds with its activities, having received acknowledgement that the set of data 108 that it wrote have been safely persisted.

Although many processing steps have been described for storing the set of data 108 in cache page 178a, it should be appreciated that the data storage system 116 can generally perform such processing steps quickly and without the need to perform inefficient disk accesses. Thus, the data storage system 116 can perform the described data logging, caching, and responding activities without adding significant latency to the processing of IO request 112.

With the set of data 108 safely persisted in cache page 178a, flushing the cache page 178a to the LUNs 174 is not a high priority. Rather, holding the set of data 108 in the cache page 178 may be beneficial in that it enables subsequent IO requests to access the set of data 108 quickly and without the need to fetch the set of data 108 from disk. In addition, as will be described in further detail below, the storage location 175, to which the log entry 146 is mapped, is generally not the final destination of the set of data 108. Although location 175 supports the second log entry 146, via the above-described correspondences, the ultimate target location of the set of data 108 typically resides elsewhere, i.e., at a location corresponding to a mapped physical address in FS2. Thus, under optimal circumstances, the unified system cache 170 waits to flush the cache page 178a until its target location has been determined, which occurs only when DL2 flushes the second log entry 146 to FS2.

Figure 2:
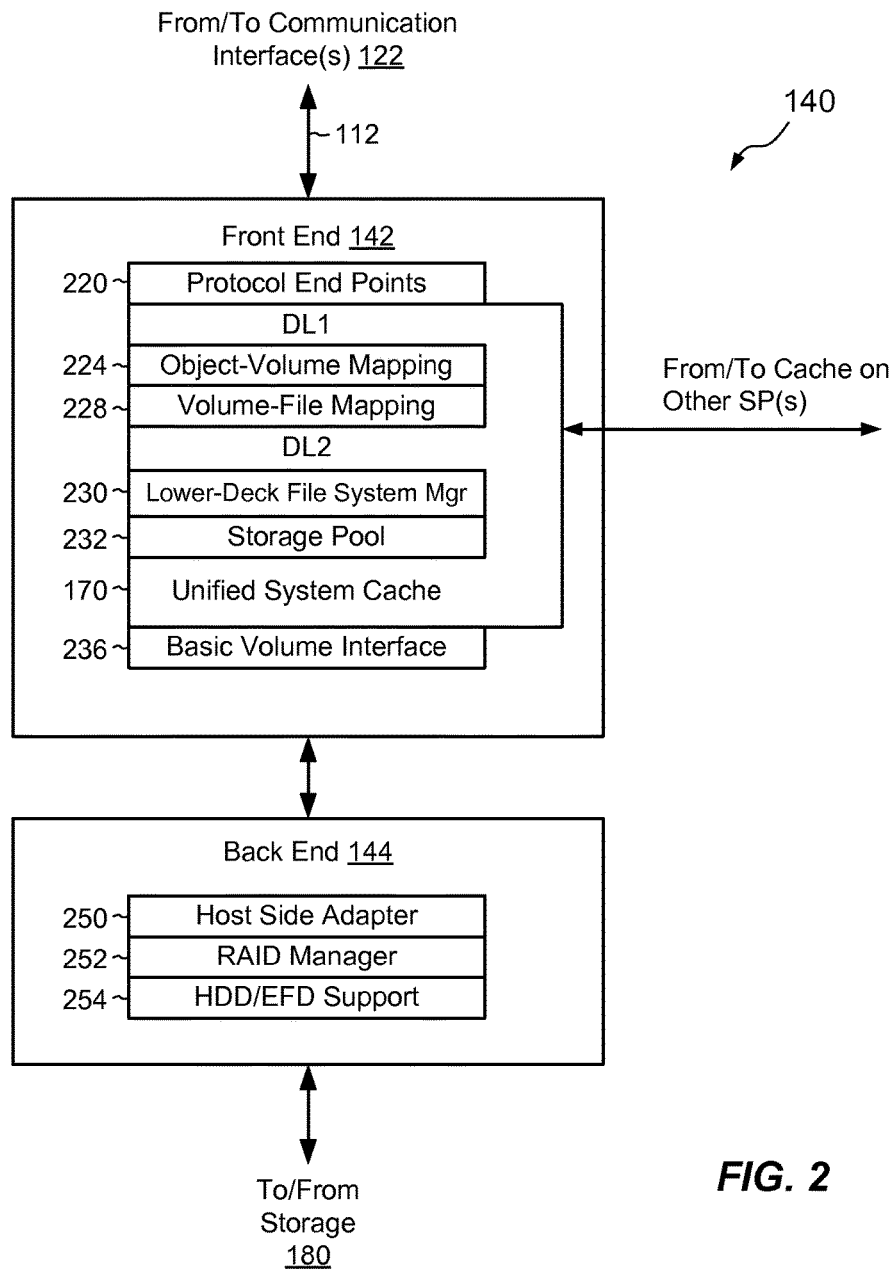
FIG. 2 is a block diagram of an example IO stack of FIG. 2.

FIG. 2 shows the example IO stack 140 of FIG. 1 in additional detail, and it is included to provide additional context for the improvements disclosed herein. As shown, the IO stack 140 is seen to include a front end 142 and a back end 144. The front end 142 and back end 144 may be operated together on the same SP, as they are in FIG. 1, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include, from top to bottom, protocol end points 220, the first data log (DL1), an object-volume mapping layer 224, a volume-file mapping 228, the second data log (DL2), a lower-deck (internal) file system manager 230, a storage pool 232, the unified system cache 170, and a basic volume interface 236.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the 10 stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The RAID manager 252 also expresses RAID groups 190 in the form of internal LUNs 174 (FIG. 1). The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 170 provides caching services for internal LUNs 174. In addition, and as described in connection with FIG. 1, the unified system cache 170 provides caching services for DL1 and DL2, which are inserted at higher levels in the IO stack 140.

The storage pool 232 organizes elements of the storage 180 in the form of slices. A "slice" is an increment of storage space, such as 256 MB or 1 GB in size, which is composed from a portion of an internal LUN 174. The pool 232 may allocate slices to lower-deck file systems to support the storage of data objects. The pool 232 may also deallocate slices from lower-deck file systems if storage provided by the slices is no longer required.

The lower-deck file system manager 230 builds and manages internal, lower-deck file systems (like FS2) upon slices served by the storage pool 232. In some examples, lower-deck file systems can realize both block-based objects and file-based objects in the form of files, like the file 150 (FIG. 1). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, include other files that realize snaps of the file that stores the data object. Some implementations allow for storing additional files. Each lower-deck file system has an inode table. The inode table provides a different inode for each file stored in the respective lower-deck file system. Each inode stores properties of a respective file, such as its ownership, and includes and/or points to block pointers that map logical addresses of the file to physical addresses of blocks that store the file's data. As already stated, a "block" is the smallest allocatable unit of storage, which may be 8 KB in size, for example. Blocks may be of sizes different from 8 KB, however, and a data storage system may use blocks of different sizes for storing different types of data and/or metadata.

The volume-file mapping 228 maps each file realizing a data object to a respective internal volume (or LUN). Higher levels of the IO stack 140 can then access the internal volume using block-based semantics. The volume-file mapping can be achieved in a variety of ways. According to one example, a file realizing a data object is regarded as a range of blocks, and the range of blocks is expressed as a corresponding range of offsets into the file. Because volumes are accessed based on identifier (logical unit number) and offset, the volume-file mapping 228 can establish a one-to-one correspondence between logical offsets into a file and physical offsets into the corresponding internal volume, thus providing the requisite translation needed to express the file in the form of a volume.

The object-volume mapping layer 224 maps internal volumes to respective data objects accessible to hosts, such as host LUNs, host file systems, and VVols, for example. For host LUNs, object-volume mapping may involve a simple remapping from a format compatible with the internal LUN to a format compatible with the host LUN. In some examples, no remapping is needed. For host file systems, like FS1 (FIG. 1), object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228. Mapping of VVols can be achieved in similar ways. For block-based VVols, the object-volume mapping layer 224 may perform mapping substantially as it does for host LUNs. For file-based vVOLs, the object-volume mapping layer 224 may perform mapping by converting host-specified offsets into VVol files to corresponding offsets into internal LUNs.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Additional information about an example data storage system in which the improved technique hereof can be practiced is provided in U.S. patent application Ser. No. 13/828,322, filed Mar. 14, 2013, the contents and teachings of which are incorporated herein by reference in their entirety.

Figure 3:
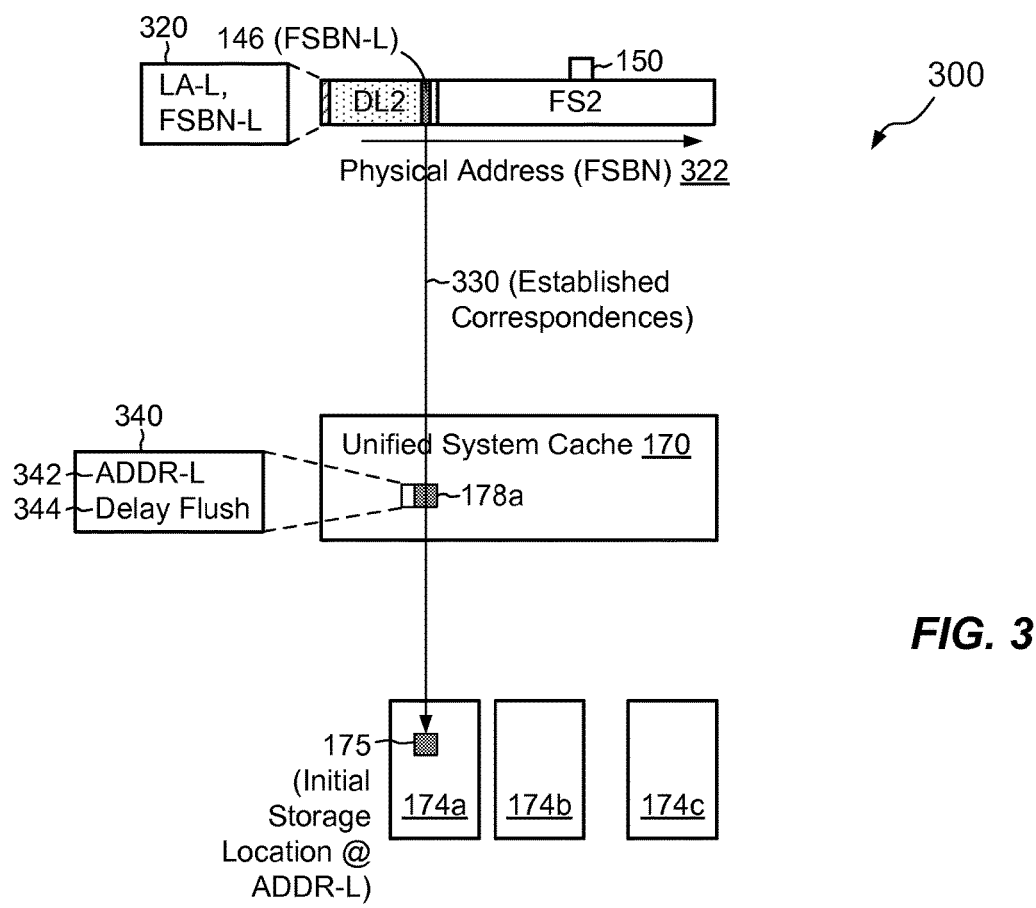
FIG. 3 is a block diagram of example file system structures within the IO stack of FIGS. 1 and 2 arranged to cache data directed to the second file system.

FIG. 3 shows an example portion 300 of the IO stack 140 in additional detail and illustrates an arrangement for storing the set of data 108 in the cache page 178. FIG. 3 focuses only on activities performed at the lower deck, i.e., in connection with FS2 and DL2. Activities performed at both the upper deck and the lower deck will be described in more detail further below.

As shown in FIG. 3, the second data log, DL2, includes a log descriptor 320 that describes the second log entry 146. For example, the log descriptor 320 stores the above-described metadata for identifying the location of the second log entry 146 in DL2. For simplicity, it is assumed in this example that the set of data 108 fits within a single block, which can be described by a single physical address in FS2, i.e., FSBN-L. Here, "FSBN" is an acronym for "File System Block Number," which provides a way of identifying physical addresses, and "L" stands for "lower deck." If the set of data 108 occupied multiple blocks, the log descriptor 320 would instead indicate a span of FSBNs, such as by providing a starting FSBN and a length. The file system FS2 as a whole can be seen to have an FSBN range 322, which, in an example, extends consecutively from zero to some large number. DL1 may include a log descriptor, like 320, for each active log entry. Only the log descriptor for entry 146 is shown for simplicity.

In this example, the log descriptor 320 is also seen to store a logical address, LA-L, of the set of data 108 within FS2, with LA-L indicating, for example, a logical offset (or offset range) into the file 150. In an example and in a manner that will later become apparent, LA-L is computed by the IO stack 140 based upon the logical address to which the IO request 112 (FIG. 1) is directed, i.e., the logical address within FS1.

It should be understood that the file data of the file 150 is typically stored in blocks at various physical addresses (FSBNs) within FS2. Also, file system metadata supporting the file 150 are stored within other blocks at various FSBNs of FS2. The file system metadata organizes the file 150 and keeps track of the FSBNs where the file data are stored. The FSBNs storing the file data may be distributed across many different ranges of the file system and are often out of order, e.g., unless special efforts are made to keep them sequential. Thus, the file system metadata typically maps sequential ranges of logical offsets into file 150 to (generally) distributed, scattered, and out-of-order physical addresses (FSBNs) within FS2.

As described above, the data storage system 116 establishes correspondences (labeled 330) between FSBNs of FS2 and respective storage locations on internal LUNs 174. Thus, each FSBN in FS2, including those supporting DL2, has an associated location on disk, which is addressed by LUN identifier (e.g., one of LUNs 174a, 174b, and 174c) and offset. In an example, the correspondences 330 are established by translating FSBNs of FS2 through memory-resident data structures that map FSBNs to respective locations within slices, and that map slice locations to respective locations on LUNs 174. Other examples may entail other levels of translation. Here, it is understood that the term "disk" is used in the general sense and is intended to include not only an individual disk drive, but also a logical LUN 174, which itself is supported by a RAID group 190 (or by multiple RAID groups), which is composed from multiple disk drives (e.g., magnetic, optical, flash, etc.). Thus, the term "disk" is used generally and broadly herein to refer to any storage drive or device, any portion thereof, or any combination thereof, including any combination of portions.

As further shown in FIG. 3, the cache page 178a within unified system cache 170 is provided with a tag 340. In an example, the tag 340 is a memory location within the unified system cache 170 that the unified system cache 170 associates with the cache page 178a, e.g., as a header or as other metadata that points to or is otherwise associated with the cache page 178a. The tag 340 may store various information pertaining to the page 178a. Here, the tag 340 is seen to store an address indicator, ADDR-L (342), as well as a "Delay Flush" indicator 344. ADDR-L is the address of storage location 175 in LUN 174a (see also FIG. 1) and provides the storage address that the correspondences 330 associate with FSBN-L, i.e., the FSBN of the second log entry 146. In an example, the value of ADDR-L is written to the tag 340 as part of a process for allocating the cache page 178a for storing the set of data 108; however, this is not required. As a result of tagging page 178a with ADDR-L, an association is established among FSBN-L, cache page 178a, and storage location 175.

It should be appreciated that the arrangement of FIG. 3 may be used with or without an upper-deck file system and an associated data log, e.g., for performing data logging and cache writes at the lower deck for any object served from a file (like file 150). For example, the arrangement of FIG. 3 may support data logging for host-accessible LUNs or VVols, which do not require an upper-deck file system. To support data logging for a host-accessible LUN, the logical address LA-L entered in descriptor 320 would be based on a physical offset into the host-accessible LUN, e.g., after translation through a volume-file. Thus, the portion 300 of the IO stack 140 has a potentially independent role, as it can provide logging for other data objects besides upper-deck file systems.

Figure 4:
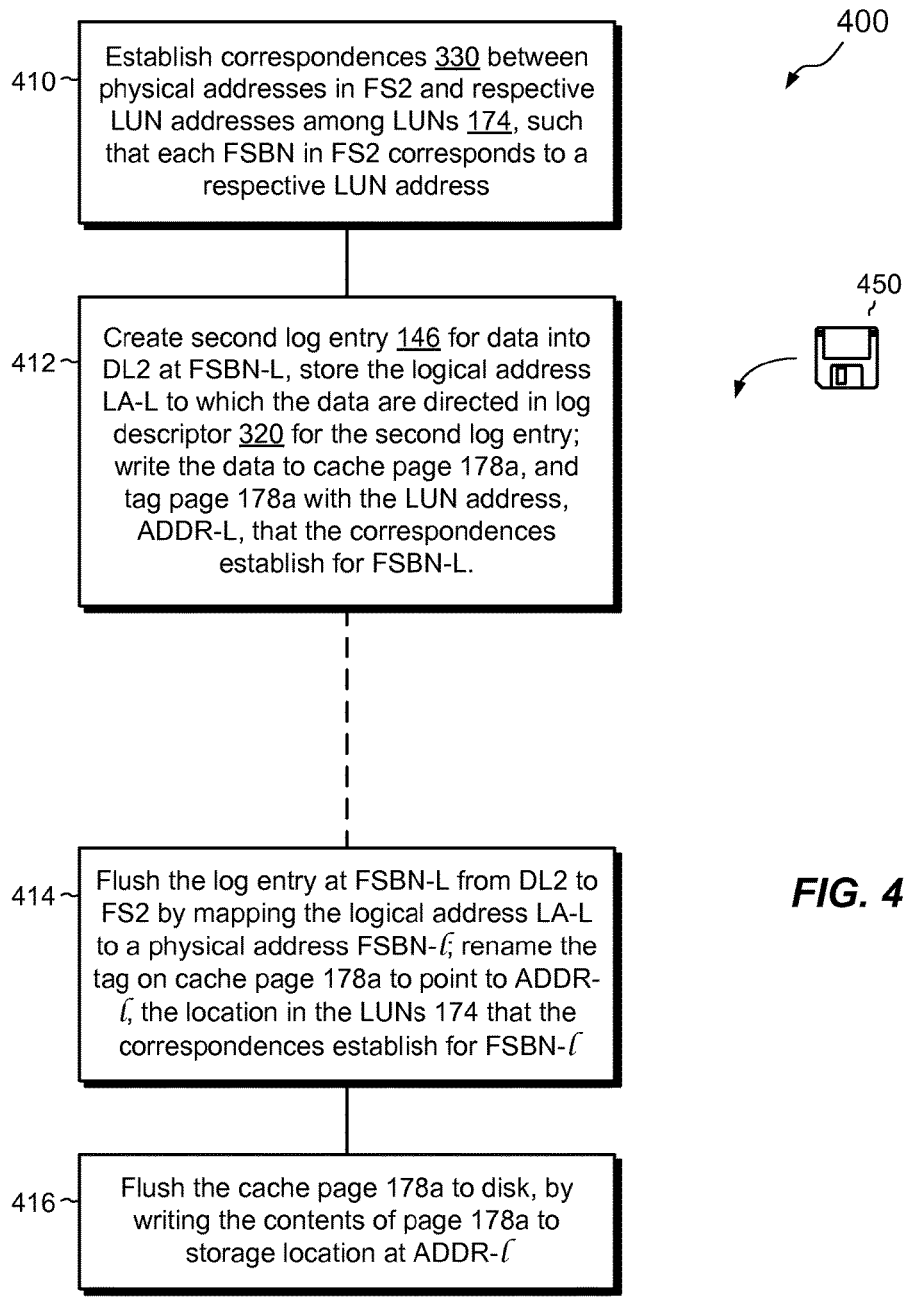
FIG. 4 is a flowchart showing an example process for managing a data log used for caching data in the arrangement of FIG. 3.

FIG. 4 shows an example process 400 for operating the portion 300 of the IO stack 140 shown in FIG. 3. Acts 410 and 412 pertain to placing the set of data 108 in the cache page 178, and acts 414 and 416 pertain to flushing from FS2 (414) and flushing from the unified system cache (416).

At 410, correspondences 330 are established between physical addresses (FSBNs) of FS2 and respective storage locations among the LUNs 174, such that each FSBN in FS2 corresponds to a respective storage location (i.e., LUN address). In some examples, certain FSBNs may be excluded. This act may be performed at any suitable time, including prior to processing the IO request 112.

At 412, the log manager for DL2 creates the second log entry 146 at physical address FSBN-L in FS2. The log manager for DL2 stores the logical address, LA-L, to which the set of data 108 is directed in FS2, in log descriptor 320. The log manager further directs the unified system cache 170 to write the set of data 108 to cache page 178a and to write ADDR-L in address indicator 342. The log manager may also direct the unified system cache 170 to write a "Delay Flush" indicator 344.

At 414, sometime later, e.g., at flush time for DL2, the log manager for DL2 flushes the second log entry 146, located at FSBN-L, to FS2 by mapping the logical address, LA-L, to a corresponding physical address FSBN-$\ell$ ((shown also in FIG. 6). In an example, "flush time" may occur at predetermined intervals of time and/or in response to DL2 reaching a high water mark (i.e., becoming full). Mapping may be performed by referring to file system metadata structures for file 150 and identifying, via those structures, the FSBN of the block in FS2 corresponding to LA-L. Also at this time, or around this time, the log manager for DL2 sends a rename request to the unified system cache 170 to rename the address indicator 342 on cache page 178a from ADDR-L to ADDR-$\ell$,, i.e., the address of the storage location that the correspondences 330 associate with FSBN-$\ell$,. This renaming activity binds cache page 178a to the storage location at ADDR-$\ell$,.

At 416, the unified system cache 416 itself performs a flushing operation, and flushes the page 178a to disk. As a result of the rename operation having changed the address indicator to ADDR-$\ell$,, the unified system cache 170 flushes the contents of cache page 178a to the storage location at ADDR-$\ell$,, rather than flushing it to the storage location at ADDR-L. Because ADDR-$\ell$ (backs FSBN-$\ell$,, this flushing operation places the set of data 108 in the proper, mapped location within the persistent file system structures of FS2.

It should be appreciated that significant time may pass between flushing the second log entry 146 (at 414) and flushing the cache page 178a (at 416). Indeed, the unified system cache 170 may keep the page 178a in cache until it needs to reuse the page for some other purpose.

Figure 5:
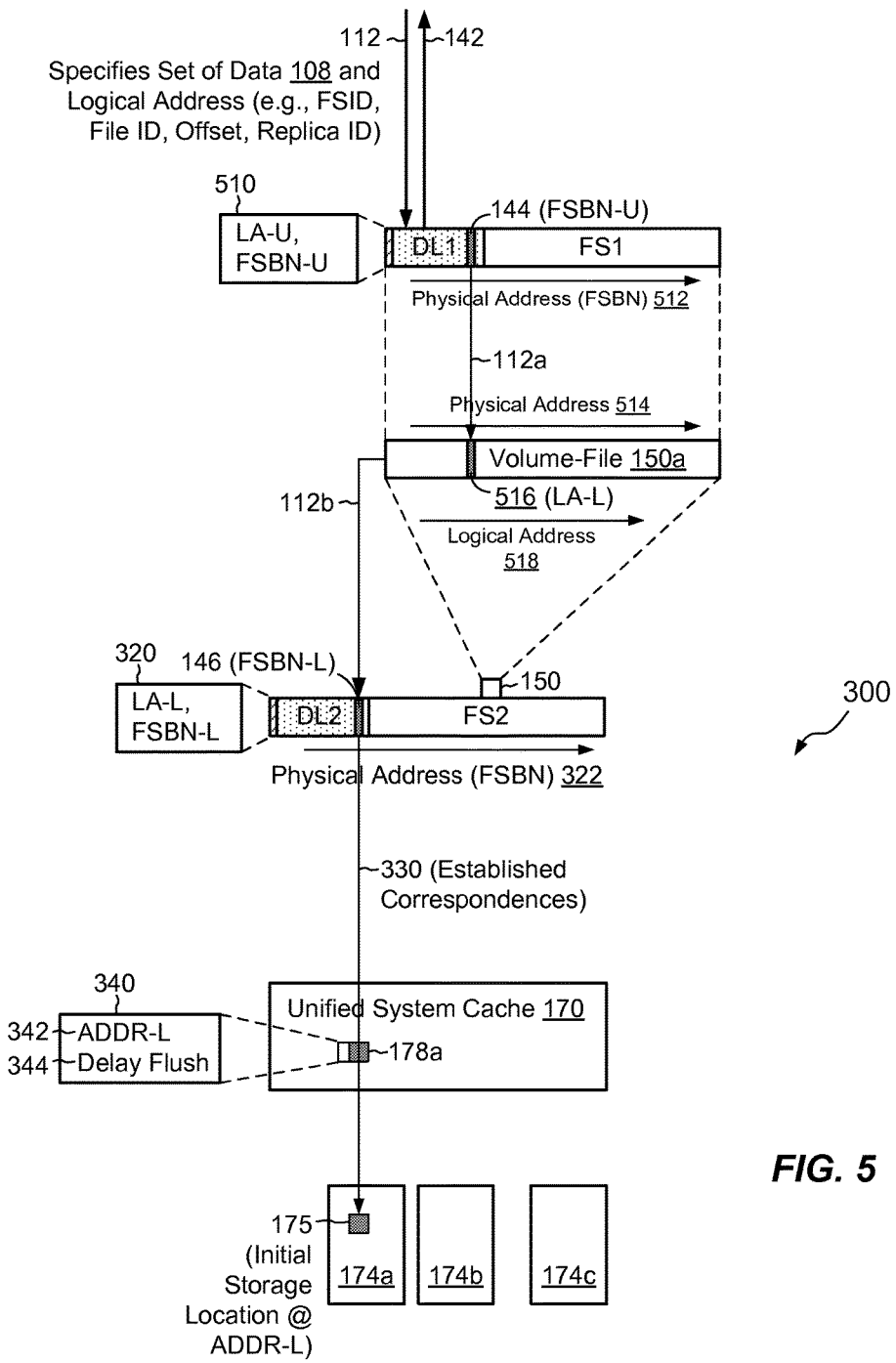
FIG. 5 is a block diagram of example file system structures within the IO stack of FIGS. 1-3 arranged to cache data directed to the first file system.

FIG. 5 shows a more detailed view of the IO stack 140 and includes the portion 300 (FIG. 3) of the IO stack as well as additional features. Here, it is seen that the IO stack 140 builds upon the portion 300 to provide data logging for the upper-deck file system, FS1. As will be described, providing data logging for FS1 involves more than simply operating DL1 and DL2 independently, but rather involves coordination between these data logs and their associated activities.

In operation, the IO stack 140 receives IO request 112 and directs it to the first data log, DL1. IO request 112 specifies the set of data 108 to be written and identifies a logical address, LA-U ("U" for "upper deck") to which the set of data 108 are directed. The log manager for DL1 creates the first log entry 144, e.g., at the tail of DL1, and stores metadata describing the first log entry 144 in a log descriptor 510. The log descriptor 510 stores the logical address, LA-U, as well as the FSBN of log entry 144 in FS1, i.e., FSBN-U. Again, it is assumed that the set of data 108 fits within a single block described by a single FSBN. However, the log descriptor 510 may alternatively indicate a range of physical addresses in place of FSBN-U if greater than one block is required. It is understood that DL1 may have many log descriptors, like descriptor 510, e.g., one for each log entry. FS2 is seen to have a physical address space 512, e.g., which ranges from zero to some large number.

Further down the IO stack 140, it is seen that the file 150 in FS2 is expressed as a volume-file 150a, e.g., by the volume-file mapping 228, as described in connection with FIG. 2. The volume-file 150a has a logical address range 518, corresponding to logical offsets within the file 150. The volume-file 150a expresses this logical address range 518 in the form of a volume having a corresponding physical address range 514. Thus, the volume-file translates logical addresses 518, into the file 150, to physical addresses 514 of the expressed volume, and vice-versa.

The volume-file 150a expresses a volume upon which FS1 is built. For example, the volume expressed by the volume file 150a is divided into slices (not shown), which are provisioned into the physical address range 512 of FS1. The resulting arrangement provides a direct translation between physical addresses 512 of FS1 and physical addresses 514 expressed by the volume-file 150a. Given the translation provided by the volume-file 150a itself, it is seen that there is also a direct translation between physical addresses 512 of FS1 and logical addresses 518 of the file 150.

When DL1 in FS1 receives log entry 144 at physical address FSBN-U, the IO stack 140 issues a write request 112a to the volume-file 150a at a physical address (among 514) that corresponds to FSBN-U. The volume-file 150a translates this physical address into a logical address 516 (LA-L) of the file 150. In response to receiving the write request 112a, the volume-file 150a (e.g., a manager thereof), sends write request 112b to DL2. The portion 300 of the IO stack 140 then operates as described in connection with FIGS. 3 and 4. For example, log entry 146 and descriptor 320 are created. Descriptor 320 includes the logical address LA-L to which request 112b is directed and the physical address FSBN-L at which log entry 146 was made. Through established correspondences 330, the set of data 108 specified in request 112 (also 112a and 112b) are directed to initial storage location 175. However, the set of data 108 are first stored in cache page 178a, which has tag 340 providing an address indicator 342 specifying the LUN address of location 175 (ADDR-L) and a delay-flush indicator 344. The delay-flush indicator 344 directs the unified system cache 170 to hold off on flushing cache page 178a, if possible, to delay any writing to location 175, which preferably does not occur unless the unified system cache 170 is very low on available space.

Figure 6:
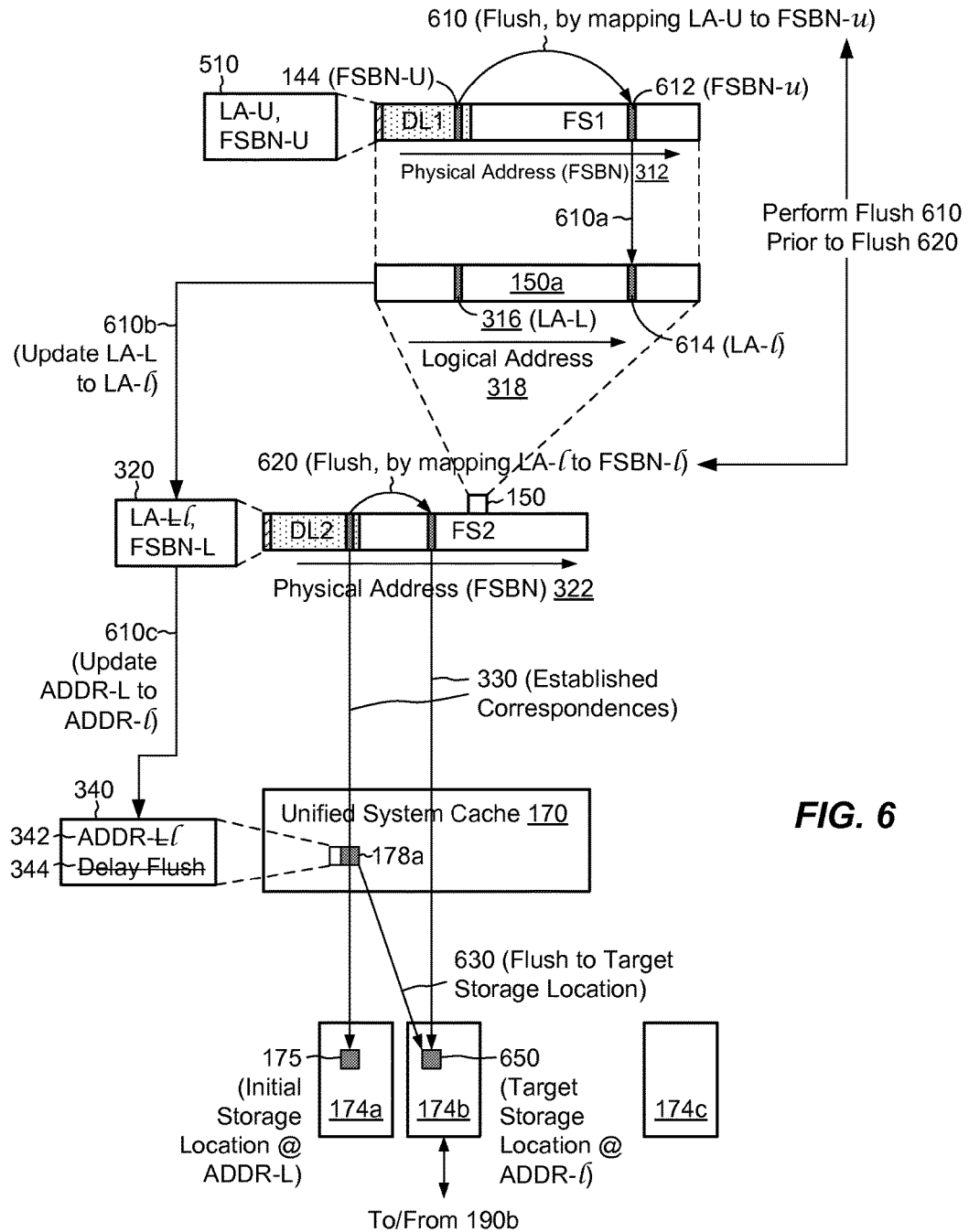
FIG. 6 is a block diagram showing an arrangement for flushing data cached in the arrangement of FIG. 5.

FIG. 6 shows the same physical arrangement as is shown in FIG. 5. Here, however, the arrangement is described in connection with a syncing operation, which is directed to syncing the set of data 108 to disk.

The syncing operation may be initiated at flush time for DL1, i.e., when DL1 flushes log entry 144 to FS1, e.g., to make room in DL1 for newly arriving data. Here, flushing operation 610 performs mapping, e.g., through file system metadata structures of FS1, to map logical address LA-U to the physical address corresponding to LA-U in FS1. This mapped physical address is denoted herein as FSBN-u. FS1 then initiates an operation to write the set of data 108 to FSBN-u, which results in a write 610a to the volume-file 150a. Via the above-described correspondence between FSBNs of FS1 and logical addresses of file 150, the volume-file identifies logical address 614, denoted here as LA-$\ell$,, which corresponds to FSBN-u. The volume-file 150a (e.g., a manager thereof) then issues rename instruction 610b to change logical address LA-L to LA-ℓ in descriptor 320. The log manager of DL2 updates the descriptor.

Sometime later, e.g., at flush time for DL2, flushing operation 620 performs mapping, e.g., through file system metadata structures of FS2, to map logical address LA-ℓ to the physical address corresponding to LA-ℓ in FS2. This mapped physical address is denoted as FSBN-ℓ. By virtue of the established correspondences 330, FSBN-ℓ translates to target storage location 650 at LUN address ADDR-ℓ. As shown, target storage location 650 is different from initial storage location 175 and provides the proper destination for the set of data 108 within the persistent structures of FS2. With the set of data 108 still being held in cache page 178a, the log manager for DL2 sends request 610c to the unified system cache 170. The request 610 updates the address indicator 342 from ADDR-L to ADDR-ℓ, , to indicate the proper address of target storage location 650. The request 610c also directs the unified system cache 170 to remove or otherwise invalidate the delay-flush indicator 344. Although it may still be beneficial to delay flushing of cache page 178a, flushing the page, if required, will at least place the set of data 108 at its proper mapped destination.

Sometime later, when the unified system cache 170 needs to flush cache page 178a, e.g., to make room for other data, the unified system cache 170 performs flush operation 630 to flush the set of data 108 to the target storage location 650 at ADDR-ℓ.

Given the above-described operation, it is evident that the flushing operation 610 to FS1 should preferably take place prior to the flushing operation 620 to FS2, i.e., after the logical address in the descriptor 320 has been changed from LA-L to LA-ℓ to reflect the proper mapped location of the set of data 108 within FS1. Proper operation can still ensue if the flushing operation 620 should occur first. In this case, however, additional overhead will be required. For example, the set of data 108 will need to be read back into the unified system cache 170 from location 175 and then re-flushed to location 650.

Figure 7:
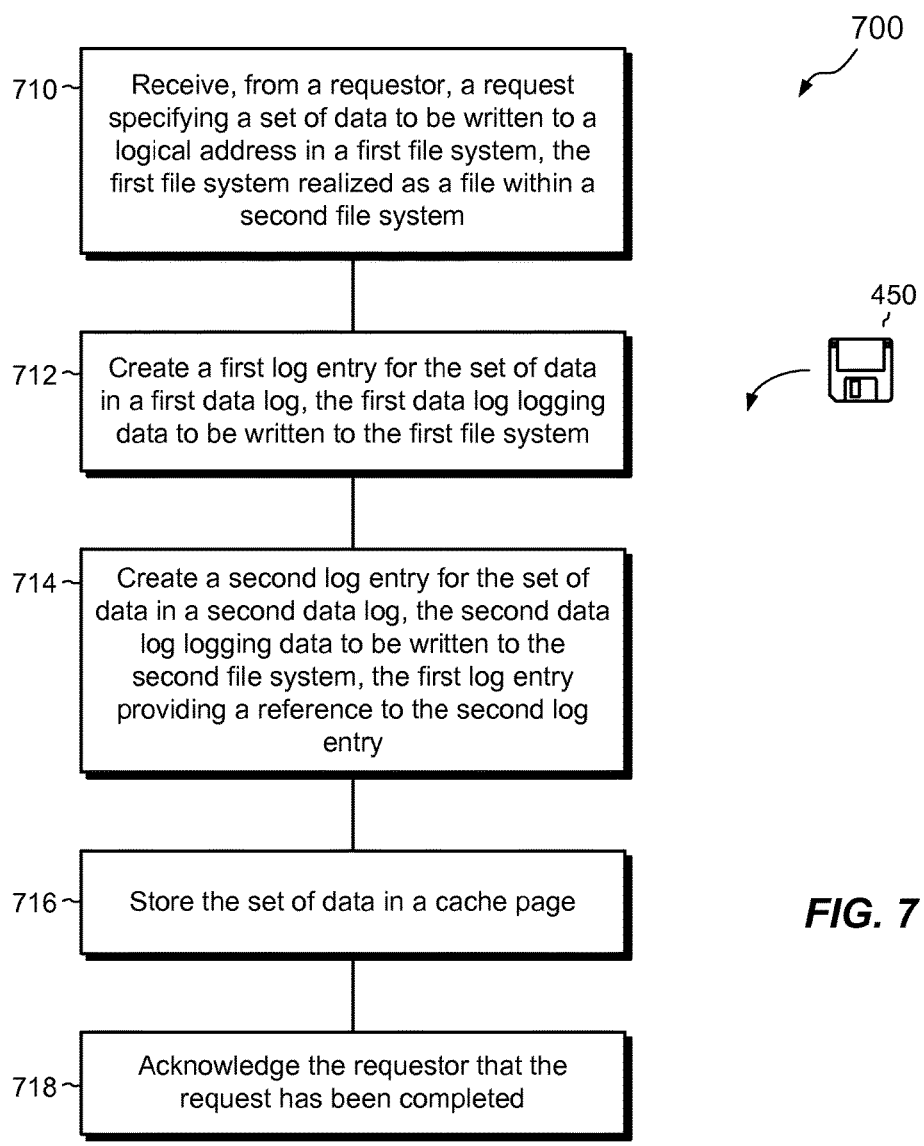
FIG. 7 is a flowchart showing an example process for storing data in a data storage system.

FIG. 7 shows an example process 700 that may be carried out in connection with the computing environment 100. The process 700 is typically performed by the software constructs described in connection with FIGS. 1-3, 5, and 6, which reside in the memory 130 of SP 120 and are run by the set of processing units 124. The various acts of the process 700 may be ordered in any suitable way. Accordingly, embodiments may be constructed in which acts are performed in orders different from those illustrated, which may include performing some acts simultaneously, even though the acts are shown as sequential in the illustrated embodiments.

At 710, a request is received from a requestor. The request specifies a set of data to be written to a logical address in a first file system. The first file system is realized as a file within a second file system. For example, the data storage system 116 receives IO request 112 from one of the hosts 110(1-N) (FIG. 1). The IO request 112 specifies a set of data 108 and a logical address (LA-U; FIG. 5) to which the set of data 108 are to be written in FS1. File system FS1 is an upper-deck file system (FIG. 2) realized in a file 150 within FS2. FS2 is a lower-deck file system. Although the requestor in this example is a host, it should be appreciated that the requestor may alternatively be some other computer, device, or software construct, including a software construct running in the data storage system 116 itself.

At 712, a first log entry is created for the set of data in a first data log. The first data log logs data to be written to the first file system. For example, first log entry 144 is created in DL1, e.g., at the tail of DL1, for receiving the set of data 108. Creating the first log entry 144 may entail creating metadata, such as log descriptor 510 (FIG. 5), for logging the first log entry 144 in DL1, and allocating space in DL1 for accommodating the set of data 108. In this example, the set of data 108 are not written at this time, however. Also, in an example, DL1 is dedicated to FS1, in that DL1 performs logging of data writes to FS1, exclusively.

At 714, a second log entry is created for the set of data in a second data log. The second data log logs data to be written to the second file system. The first log entry provides a reference to the second log entry. For example, second log entry 146 is created in DL2, e.g., at the tail of DL2, for receiving the set of data 108. Creating the second log entry 146 may entail creating metadata, such as log descriptor 320 (FIG. 5), for logging the second log entry 146 in DL2, and allocating space in DL2 for accommodating the set of data 108. As before, the set of data 108 are not written at this time, however. Also, in an example, DL2 is dedicated to FS2, in that DL2 performs logging of data writes to FS2, exclusively. As shown in FIG. 5, the first log entry 144 provides a reference to the second log entry 146 by storing FSBN-U of the first entry 144 in log descriptor 510. As described previously, physical address FSBN-U in FS1 resolves to logical address 516 (LA-L) of the file 150 and descriptor 320 for the second log entry 146 stores this logical address, LA-L. Thus, the log descriptor 510 for the first log entry 510 provides a reference to the log descriptor 320 for the second log entry 146 via FSBN-U and LA-L. In some examples, other types of references may be provided. For example, descriptor 510 may include a pointer directly to descriptor 320.

At 716, the set of data are stored in a cache page. For example, the data storage system 116 may store the set of data 108 in cache page 178a of the unified system cache 170 after log entries 144 and 146 have been created (FIG. 5). In so doing, tag 340 may be written to specify the LUN address (e.g., ADDR-L) that corresponds (via correspondences 330) to FSBN-L, the physical address of the second log entry 144 in FS2. A delay-flush indicator 344 may also be provided. In the example described, storing the set of data 108 in the cache page 178a is the first time that the IO stack 140 stores the set of data 108. In an example, the set of data 108 are received in mbuffer transmissions over the network 114, and writing the set of data 108 to cache page 178a is a DMA (direct memory access) transmission from the communication interfaces 122 (e.g., a network adapter) directly to the cache page 178a.

At 718, the requestor is acknowledged to indicate that the request has been completed. For example, once the set of data 108 have been stored in the cache page 178a, the IO stack 140 returns acknowledgement 142, in a response to the IO request 112, to inform the requestor that the IO request 112 has been completed. In the example provided, the acknowledgement 142 not only indicates receipt of the set of data 108, but also indicates that the set of data 108 have been persistently stored. In other examples, the cache page need not be persistent and the acknowledgement need not indicate persistent storage of the set of data.

An improved technique has been described for storing data in a data storage system 116. The technique includes receiving, from a host (e.g., one of hosts 110(1-N)), a request 112 specifying a set of data 108 to be written to a first file system, FS1, the first file system realized as a file 150 within a second file system, FS2. A first log entry 144 is created for the set of data 108 in a first data log, DL1, which logs data to be written to the first file system, FS1, and a second log entry 146 is created for the set of data 108 in a second data log, DL2, which logs data to be written to the second file system, FS2. The first log entry 144 provides a reference to the second log entry 146. The technique further includes storing the data in a cache page 178a and acknowledging the host.

Having described certain embodiments, numerous alternative embodiments or variations can be made. For example, the disclosed embodiments store the set of data 108 in the cache page 178a only after creating the first log entry 144 in DL1 and the second log entry 146 in DL2. Although this approach ensures transactional consistency and generally avoids long delays, as the activities may be performed with memory-resident structures, other alternatives are possible. For instance, the IO stack 140 may store the set of data 108 in cache page 178a (or in some other cache page) prior to creating log entries 144 and 146, such as soon after receipt of IO request 112. In this case, however, other actions may be needed to ensure transactional consistency, e.g., among multiple arriving IO requests, until the log entries can be made.

Also, although the disclosed embodiments address a two-level file system structure, where FS1 is implemented in a file 150 within FS2, nothing herein should be construed as limiting the structure to two levels. For instance, in other examples, FS2 may itself be implemented as a file within a third file system. Indeed, the stack-up can continue and can include any number of file systems nested within other file systems. In this situation, the semantics for storing and flushing data will proceed as described for the first file system for all but the bottom file system, with the semantics governing the bottom file system matching those described herein for FS2.

Further, although the disclosed embodiments show separate data logs, DL1 and DL2, for the FS1 and FS2, respectively, such data logs need not be physically distinct. Thus, for example, DL1 and DL2 may exist as logically distinct logs within a common physical log.

Further, although a particular mapping and address translation scheme is disclosed, it should be understood that different implementations may provide different mapping and address translation schemes. Such alternative schemes are intended to be included as alternative embodiments herein, even if not specifically disclosed.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 450 in FIGS. 4 and 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method for storing data in a data storage system, the method comprising:
   receiving, from a requestor, a request specifying a set of data to be written to a logical address in a first file system, the first file system realized as a file within a second file system;
   creating a first log entry for the set of data in a first data log, the first data log (i) logging data to be written to the first file system, (ii) having a head and a tail, and (iii) arranged as a circular buffer;
   creating a second log entry for the set of data in a second data log, the second data log logging data to be written to the second file system, the first log entry providing a reference to the second log entry;
   storing the set of data in a cache page; and
   acknowledging the requestor that the request has been completed.

2. The method of claim 1, further comprising performing a syncing operation, the syncing operation including:
   mapping the logical address in the first file system to a corresponding target physical address in the first file system;
   translating the target physical address in the first file system to a target logical address in the second file system;
   mapping the target logical address in the second file system to a target storage location on disk; and
   flushing the cache page to the target storage location on disk.

3. The method of claim 2,
   wherein the file that realizes the first file system is a volume-file, the volume-file translating physical addresses of the first file system to logical addresses of the second file system,
   wherein the first data log is disposed within the first file system at a set of physical addresses of the first file system, and
   wherein, when creating the second log entry for the set of data, providing the reference to the second log entry includes— identifying a physical address of the first log entry in the first file system, translating, via the volume-file, the physical address of the first log entry to a logical address of the first log entry in the second file system, and writing the logical address of the first log entry in the second file system to a descriptor for the second log entry in the second data log.

4. The method of claim 3, wherein the data storage system establishes correspondences between physical addresses of the second file system and respective storage locations on disk, wherein the second data log is disposed within the second file system at a set of physical addresses of the second file system, and wherein, the established correspondences provide a respective storage location on disk for each of the set of physical addresses at which the second data log is disposed.

5. The method of claim 4, wherein the established correspondences indicate an initial storage location on disk for the physical address of the second log entry, and wherein storing the set of data in the cache page includes providing an address indicator for the cache page, the address indicator providing an address of the initial storage location on disk.

6. The method of claim 5, wherein, contemporaneously with storing the set of data in the cache page, the method further comprises providing a delayed flushing indicator for the cache page, the delayed flushing indicator configured to inform a cache manager that flushing of the cache page should be delayed.

7. The method of claim 6, wherein performing the syncing operation further includes, prior to mapping the target logical address in the second file system to the target storage location on disk, writing the target logical address to a descriptor for the second log entry in the second data log.

8. The method of claim 7, wherein, when performing the syncing operation, mapping the target logical address in the second file system to the target storage location on disk includes (i) mapping the target logical address in the second file system to a target physical address in the second file system and (ii) translating, via the established correspondences, the target physical address in the second file system to the target storage location on disk.

9. The method of claim 8, wherein, prior to flushing the cache page, performing the syncing operation further includes updating the address indicator for the cache page to identify the target storage location on disk, and wherein flushing the cache page is performed to flush the cache page to the target storage location on disk identified by the updated address indicator.

10. The method of claim 9, wherein, when updating the address indicator for the cache page, the method further comprises removing or otherwise invalidating the delayed flushing indicator for the cache page.

11. The method of claim 2, wherein mapping the logical address in the first file system to the corresponding target physical address in the first file system is performed as part of a first flushing operation in which the first log entry is flushed to the first file system, wherein mapping the target logical address in the second file system to the target storage location on disk is performed as part of a second flushing operation in which the second log entry is flushed to the second file system, and wherein the method further comprises delaying the second flushing operation until after the first flushing operation has completed.

12. The method of claim 11, further comprising:

when completing the first flushing operation, retiring the first log entry from the first data log; and when completing the second flushing operation, retiring the second log entry from the second data log.

13. The method of claim 2, wherein the cache page is part of a persistent cache realized with battery-backed, volatile memory that is mirrored across multiple storage processors in the data storage system.

14. A data storage system, comprising control circuitry that includes a set of processing units coupled to memory, the control circuitry constructed and arranged to:

receive, from a requestor, a request specifying a set of data to be written to a logical address in a first file system, the first file system realized as a file within a second file system;

create a first log entry for the set of data in a first data log, the first data log (i) logging data to be written to the first file system, (ii) having a head and a tail, and (iii) arranged as a circular buffer;

create a second log entry for the set of data in a second data log, the second data log logging data to be written to the second file system, the first log entry providing a reference to the second log entry;

store the set of data in a cache page; and acknowledge the requestor that the request has been completed.

15. The data storage system of claim 14, wherein the control circuitry is further constructed and arranged to perform a syncing operation, the syncing operation including:

mapping the logical address in the first file system to a corresponding target physical address in the first file system;

translating the target physical address in the first file system to a target logical address in the second file system;

mapping the target logical address in the second file system to a target storage location on disk; and flushing the cache page to the target storage location on disk.

16. A computer-program product including a set of non-transitory, computer-readable media having instructions which, when executed by a set of processing units of a data storage system, cause the set of processing units to perform a method for storing data, the method comprising:

receiving, from a requestor, a request specifying a set of data to be written to a logical address in a first file system, the first file system realized as a file within a second file system;

creating a first log entry for the set of data in a first data log, the first data log (i) logging data to be written to the first file system, (ii) having a head and a tail, and (iii) arranged as a circular buffer;

creating a second log entry for the set of data in a second data log, the second data log logging data to be written to the second file system, the first log entry providing a reference to the second log entry;

storing the set of data in a cache page; and acknowledging the requestor that the request has been completed.

17. The computer-program product of claim 16, wherein the method further comprises performing a syncing operation, the syncing operation including:
- mapping the logical address in the first file system to a corresponding target physical address in the first file system;
- translating the target physical address in the first file system to a target logical address in the second file system;
- mapping the target logical address in the second file system to a target storage location on disk; and
- flushing the cache page to the target storage location on disk.

18. The computer-program product of claim 17,
- wherein the file that realizes the first file system is a volume-file, the volume-file translating physical addresses of the first file system to logical addresses of the second file system,
- wherein the first data log is disposed within the first file system at a set of physical addresses of the first file system, and
- wherein, when creating the second log entry for the set of data, providing the reference to the second log entry includes—
  - identifying a physical address of the first log entry in the first file system,
  - translating, via the volume-file, the physical address of the first log entry to a logical address of the first log entry in the second file system, and
  - writing the logical address of the first log entry in the second file system to a descriptor for the second log entry in the second data log.

19. The computer-program product of claim 17,
- wherein mapping the logical address in the first file system to the corresponding target physical address in the first file system is performed as part of a first flushing operation in which the first log entry is flushed to the first file system,
- wherein mapping the target logical address in the second file system to the target storage location on disk is performed as part of a second flushing operation in which the second log entry is flushed to the second file system,
- and wherein the method further comprises delaying the second flushing operation until after the first flushing operation has completed.

20. The computer-program product of claim 19, wherein the method further comprises:
- when completing the first flushing operation, retiring the first log entry from the first data log; and
- when completing the second flushing operation, retiring the second log entry from the second data log.

* * * * *